US011981548B2

(12) United States Patent
Yamauchi et al.

(10) Patent No.: US 11,981,548 B2
(45) Date of Patent: May 14, 2024

(54) CRANE AND PATH GENERATION SYSTEM

(71) Applicant: TADANO LTD., Kagawa (JP)

(72) Inventors: Hiroshi Yamauchi, Kagawa (JP); Yoshimasa Minami, Kagawa (JP); Soichiro Fukamachi, Kagawa (JP); Kazuma Mizuki, Kagawa (JP); Shohei Nakaoka, Kagawa (JP)

(73) Assignee: TADANO LTD., Kagawa (JP)

( * ) Notice: Subject to any disclaimer, the term of this patent is extended or adjusted under 35 U.S.C. 154(b) by 415 days.

(21) Appl. No.: 17/428,886

(22) PCT Filed: Feb. 5, 2020

(86) PCT No.: PCT/JP2020/004394
§ 371 (c)(1),
(2) Date: Aug. 5, 2021

(87) PCT Pub. No.: WO2020/166455
PCT Pub. Date: Aug. 20, 2020

(65) Prior Publication Data

US 2022/0098012 A1 Mar. 31, 2022

(30) Foreign Application Priority Data

Feb. 14, 2019 (JP) ................................ 2019-024956

(51) Int. Cl.
*B66C 13/48* (2006.01)
*B66C 13/46* (2006.01)
*B66C 23/94* (2006.01)

(52) U.S. Cl.
CPC .............. *B66C 13/48* (2013.01); *B66C 13/46* (2013.01); *B66C 23/94* (2013.01)

(58) Field of Classification Search
CPC ........ B66C 23/06–14; B66C 23/36–53; B66C 13/48; B66C 13/46; B66C 23/94; B66C 23/88
See application file for complete search history.

(56) References Cited

U.S. PATENT DOCUMENTS 9,424,749 B1 * 8/2016 Reed ...................... G08G 1/166
11,267,681 B2 * 3/2022 Goto ...................... B66C 13/22
(Continued)

FOREIGN PATENT DOCUMENTS

CN 106598055 A 4/2017
CN 109095355 A 12/2018
JP 2008-152380 A 7/2008

OTHER PUBLICATIONS

Apr. 21, 2020, International Search Report issued for related PCT application No. PCT/JP2020/004394.
(Continued)

*Primary Examiner* — Sang K Kim
*Assistant Examiner* — Nathaniel L Adams
(74) *Attorney, Agent, or Firm* — Paratus Law Group, PLLC

(57) ABSTRACT

A crane includes a boom and a hook suspended from the boom by a wire rope and transports a load in a state in which the load W is suspended from the hook, and further includes a sensor that detects the position of an obstacle, and a control device that generates a transport path CR by arranging a plurality of node points in an area containing a lifting-up point and a lifting-down point of the load and connecting the node points. The control device generates a new transport path after increasing a number of node points arranged around the obstacle when the sensor detects movement of the obstacle.

6 Claims, 15 Drawing Sheets

FIG. 14B

(56) References Cited

U.S. PATENT DOCUMENTS

| | | | | |
|---|---|---|---|---|
| 2007/0219662 | A1* | 9/2007 | Sawodny | B66C 13/04 700/213 |
| 2013/0033494 | A1* | 2/2013 | Kiyota | G06T 3/0062 345/420 |
| 2021/0239837 | A1* | 8/2021 | Friend | G01S 17/42 |
| 2023/0348237 | A1* | 11/2023 | Herat | B66C 13/46 |

OTHER PUBLICATIONS

Apr. 21, 2020, International Search Opinion issued for related PCT application No. PCT/JP2020/004394.

* cited by examiner

CRANE AND PATH GENERATION SYSTEM

CROSS REFERENCE TO PRIOR APPLICATION

This application is a National Stage Patent Application of PCT International Patent Application No. PCT/JP2020/004394 (filed on Feb. 5, 2020) under 35 U.S.C. § 371, which claims priority to Japanese Patent Application No. 2019-024956 (filed on Feb. 14, 2019), which are all hereby incorporated by reference in their entirety.

TECHNICAL FIELD

The present invention relates to a crane and a path generation system. Specifically, the present invention relates to a crane and a path generation system that can generate a transport path capable of avoiding as obstacle even if the obstacle moves.

BACKGROUND ART

Conventionally, a crane that is a representative work vehicle has been known. The crane mainly includes a vehicle and a crane device. The vehicle includes a plurality of wheels and can be self-propelled. The crane device includes a wire rope and a hook in addition to a boom and can transport a load in a state in which the load is suspended.

Meanwhile, there is a crane that generates a transport path capable of avoiding an obstacle (see Patent Literature 1). In such a crane, a potential method is applied, and a broken-line approximation method is applied to determine a transport path. Then, the transport path is expressed by a fifth-order B-spline curve. However, when the potential method is applied, a transport direction of the load is determined for each grid. Therefore, depending on a lifting-down point of a load and a position of an obstacle, a transport direction away from the lifting-down point of the load is determined, and a transport path to the lifting-down point of the load may not be generated. In addition, such a crane generates a transport path for an obstacle that does not move and does not generate a transport path for an obstacle that moves such as a person and a vehicle. In addition, in order to appropriately avoid the obstacle that moves, it is effective to increase the degree of freedom in selecting a transport path around the obstacle. Therefore, there has been a demand for a crane and a path generation system that can generate a transport path capable of avoiding an obstacle even if the obstacle moves by increasing the degree of freedom in selecting a transport path around the obstacle.

CITATION LIST

Patent Literature

Patent Literature 1: JP 2008-152380 A

SUMMARY OF THE INVENTION

Problems to be Solved by the Invention

Provided are a crane and a path generation system that can generate a transport path capable of avoiding an obstacle even if the obstacle moves.

Solutions to Problems

A crane according to the present invention is a crane including a boom and a hook suspended from the boom by a wire rope and transports a load in a state in which the load is suspended from the hook, the crane being equipped with a sensor that detects the position of an obstacle and a control device that generates a transport path by arranging a plurality of node points in an area containing a lifting-up paint and a lifting-down point of the load and connecting the node points. The control device generates a new transport path after increasing a number of node points arranged around the obstacle when the sensor detects movement of the obstacle.

In the crane of the present invention, the control device increases the number of the node points inside a substantially hemispherical specific area including the obstacle.

In the crane of the present invention, the control device increases the density of the node points as approaching the obstacle.

In the crane of the present invention, the control device increases the density of the node points as approaching a moving direction side of the obstacle.

In the crane of the present invention, the control device sets a substantially hemispherical safety area including the obstacle inside the specific area and does not arrange the node points inside the safety area.

A path generation system of the present invention is a path generation system that generates a transport path of a load transported by a crane including a sensor and a communication device that communicates position information of an obstacle detected by the sensor, the path generation system being equipped with a system-side communication unit that communicates with the communication device and a system-side control device that generates a transport path by arranging a plurality of node points in an area including a lifting-up point and a lifting-down point of the load and connecting the node points. The system-side control device generates a new transport path after increasing the number of node points arranged around the obstacle when the sensor detects movement of the obstacle.

Effects of the Invention

The crane according to the present invention is equipped with the sensor that detects the position of an obstacle and the control device that generates a transport path by arranging a plurality of node points in an area including a lifting-up point and a lifting-down point of the load and connecting the node points. Then, when the sensor detects movement of the obstacle, the control device generates a new transport path after increasing the number of node points arranged around the obstacle. Such a crane increases the degree of freedom in selecting a transport path around the obstacle and enables selection of an appropriate transport path. As a result, it is possible to generate a transport path capable of avoiding the obstacle even if the obstacle moves.

In the crane of the present invention, the control device increases the number of node points inside the substantially hemispherical specific area including the obstacle. Such a crane increases the degree of freedom in selecting a transport path around the obstacle and enables selection of an appropriate transport path. As a result, it is possible to generate a transport path capable of avoiding the obstacle even if the obstacle moves.

In the crane of the present invention, the control device increases the density of the node points as approaching the obstacle. Such a crane increases the degree of freedom in selecting a transport path as a collision between the load and the obstacle is likely to occur and enables selection of an appropriate transport path. As a result, it is possible to generate a transport path capable of avoiding the obstacle even if the obstacle moves.

In the crane of the present invention, the control device increases the density of the node points as approaching the moving direction side of the obstacle. Such a crane increases the degree of freedom in selecting a transport path as a collision between the load and the obstacle is likely to occur and enables selection of an appropriate transport path. As a result, it is possible to generate a transport path capable of avoiding the obstacle even if the obstacle moves.

In the crane of the present invention, the control device sets the substantially hemispherical safety area including the obstacle inside the specific area and does not arrange the node points inside the safety area. In such a crane, a transport path in which a distance from the load to the obstacle is a certain distance or more is selected. As a result, it is possible to generate a transport path capable of avoiding the obstacle even if the obstacle moves.

The path generation system according to the present invention is equipped with the system-side communication unit that communicates with the communication device, and the system-side control device that generates a transport path by arranging a plurality of node points in an area including a lifting-up point and a lifting-down point of a load and connecting the node points. Then, when the sensor detects movement of the obstacle, the system-side control device generates a new transport path after increasing the number of node points arranged around the obstacle. Such a path generation system increases the degree of freedom in selecting a transport path around the obstacle and enables selection of an appropriate transport path. As a result, it is possible to generate a transport path capable of avoiding the obstacle even if the obstacle moves.

BRIEF DESCRIPTION OF DRAWINGS

FIGS. 3A and 3D are diagrams illustrating an arrangement of node points, FIG. 3A is a diagram illustrating the arrangement of node points as viewed from above of the crane.

FIG. 5A is a diagram illustrating the specific area as viewed from above of the crane, and FIG. 5B is a diagram illustrating the specific area as viewed from the side of the crane.

FIG. 6A is a diagram illustrating the arrangement of node points as viewed from above of the worker, and FIG. 6B is a diagram illustrating the arrangement of node points as viewed from a side of the worker.

FIG. 7A is a diagram illustrating the selectable transport path as viewed from above of the worker, and FIG. 7B is a diagram illustrating the selectable transport path as viewed from obliquely above of the worker.

FIG. 8A is a diagram illustrating the selectable transport path as viewed from above of the worker, and FIG. 8B is a diagram illustrating the selectable transport path as viewed from obliquely above of the worker.

FIG. 9A is a diagram illustrating the arrangement of node points as viewed from above of the worker, and FIG. 9B is a diagram illustrating the arrangement of node points as viewed from a side of the worker.

FIG. 10A is a diagram illustrating the selectable transport path as viewed from above of the worker, and FIG. 10B is a diagram illustrating the selectable transport path as viewed from obliquely above of the worker.

FIG. 11A is a diagram illustrating the arrangement of node points as viewed from above of the worker, and FIG. 11B is a diagram illustrating the arrangement of node points as viewed from a side of the worker.

FIG. 12A is a diagram illustrating the selectable transport path viewed from above of the worker, and FIG. 12B is a diagram illustrating the selectable transport path viewed from obliquely above of the worker.

FIG. 13A is a diagram illustrating the safety area as viewed from above of the worker, and FIG. 13B is a diagram illustrating the safety area as viewed from a side of the worker.

FIG. 14A is a diagram illustrating the selectable transport path viewed from above of the worker, and FIG. 14B is a diagram illustrating the selectable transport path viewed from obliquely above of the worker.

DESCRIPTION OF EMBODIMENTS

Figure 1:
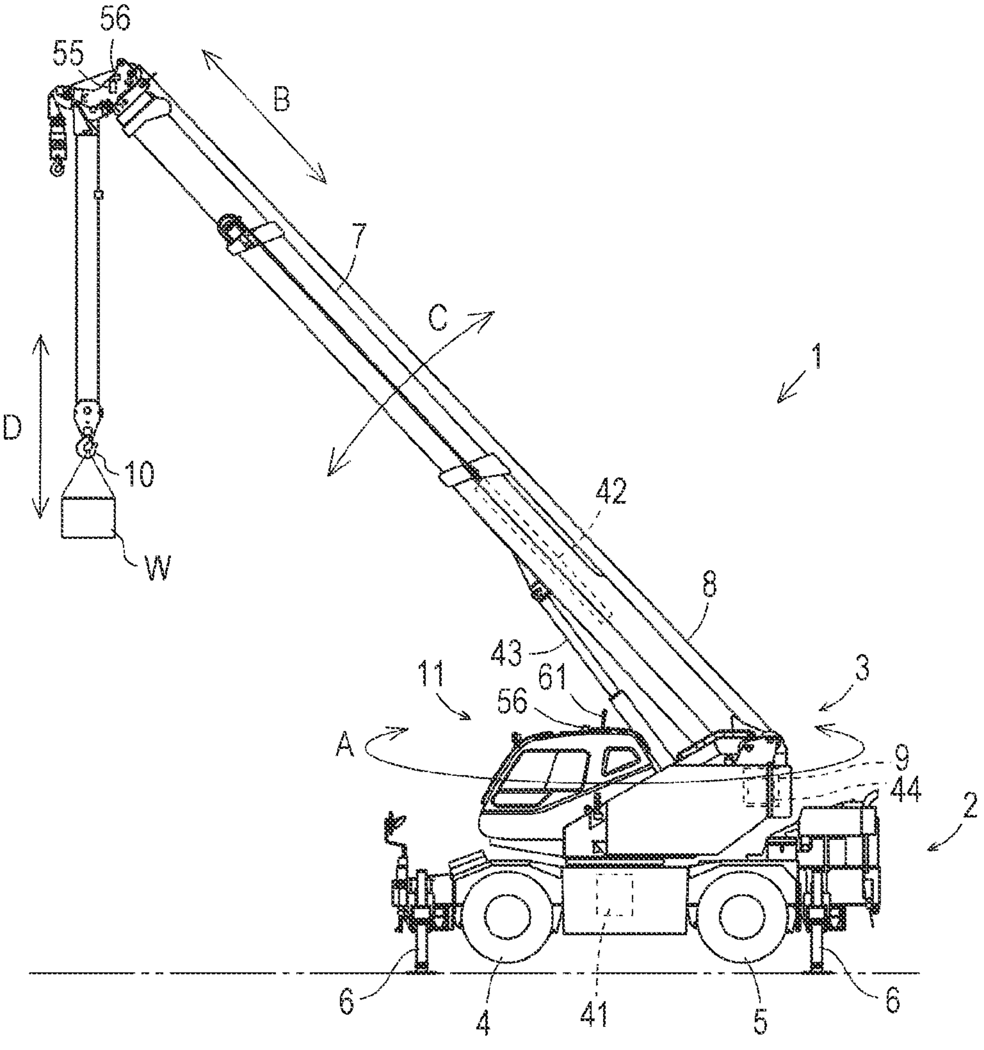
FIG. 1 is a diagram illustrating a crane.

A technical idea disclosed in the present application can be applied to other cranes in addition to a crane 1 to be described below.

First, the crane 1 according to a first embodiment will be described with reference to FIG. 1.

The crane 1 mainly includes a vehicle 2 and a crane device 3.

The vehicle 2 includes a pair of left and right front wheels 4 and a pair of left and right rear wheels 5. In addition, the vehicle 2 includes an outrigger 6 that is brought into contact with a ground to achieve stability when transport work of a load W is performed. In the vehicle 2, the crane device 3 supported above the vehicle 2 is turnable by an actuator.

The crane device 3 includes a boom 7 so as to protrude forward from a rear portion thereof. Therefore, the boom 7 is turnable by the actuator (see arrow A). In addition, the boom 7 is expandable and contractible by an actuator (see arrow B). Furthermore, the boom 7 can be raised and lowered by an actuator (see arrow C).

In addition, a wire rope 8 is stretched around the boom 7. A winch 9 around which the wire rope 6 is wound is arranged on the proximal end side of the boom 7, and a hook 10 is suspended by the wire rope 8 on the distal end side of the boom 7.

The winch 9 is formed integrally with an actuator and enables the wire rope 8 to be fed in and out. Therefore, the hook 10 can be movable up and down by an actuator (see arrow D). The crane device 3 includes a cabin 11 on a side of the boom 7.

Figure 2:
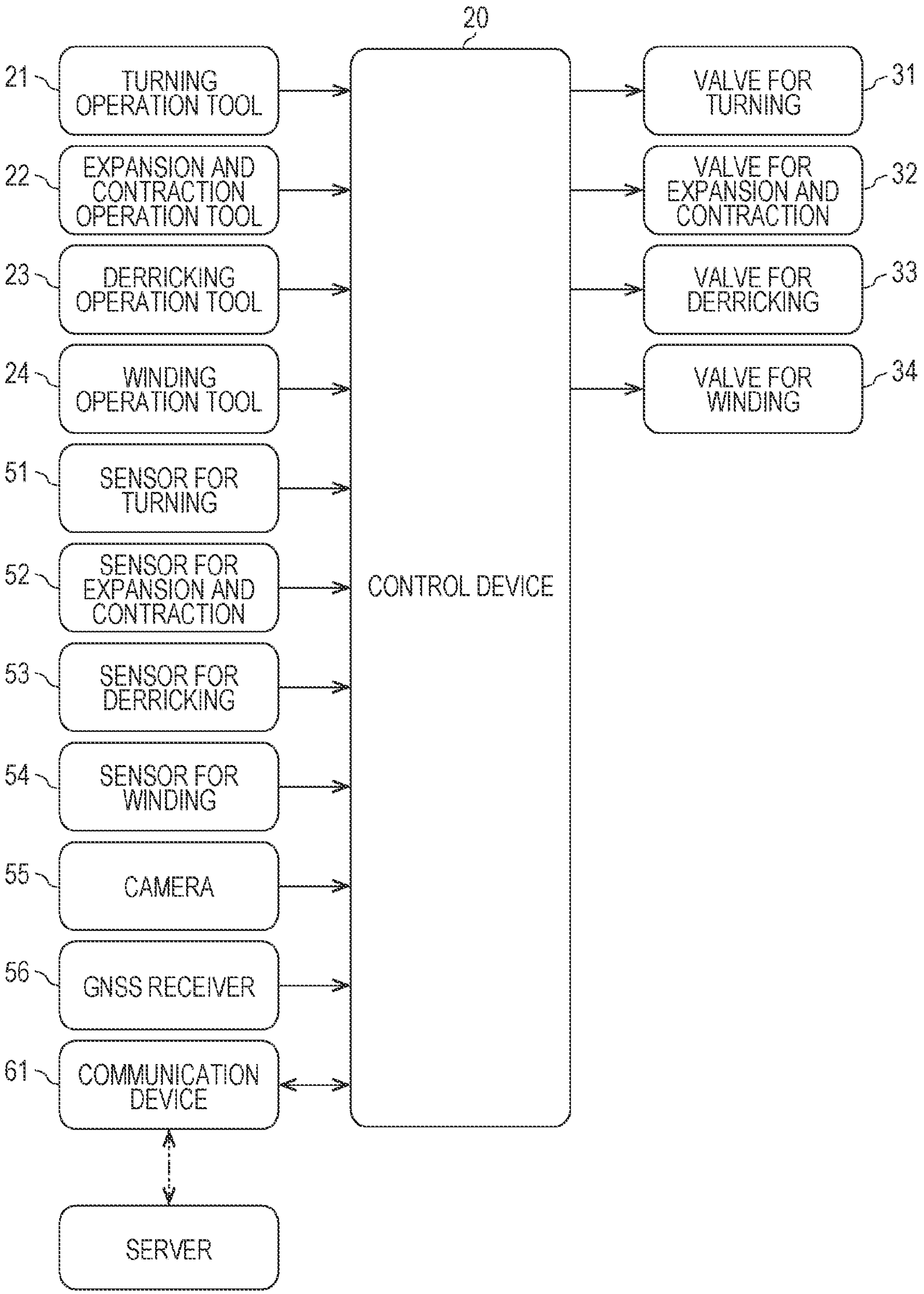
FIG. 2 is a diagram illustrating a control configuration of the crane.

Next, a control configuration of the crane 1 will be described with reference to FIG. 2.

The crane 1 includes a control device 20. Various operation tools 21 to 24 are connected to the control device 20. In addition, various valves 31 to 34 are connected to the control device 20. Furthermore, various sensors 51 to 54 are connected to the control device 20.

As described above, the boom 7 is turnable by the actuator (see arrow A in FIG. 1). In the present application, such an actuator is defined as a hydraulic motor for turning 41 (see FIG. 1). The hydraulic motor for turning 41 is appropriately operated by a valve for turning 31 that is a direction control valve. That is, the hydraulic motor for turning 41 is appropriately operated by the valve for turning 31 switching a flow direction of hydraulic oil. Note that the valve for turning 31 is operated on the basis of the operation of a turning operation tool 21 by an operator. In addition, a turning angle of the boom 7 is detected by a sensor for turning 51. Therefore, the control device 20 can recognize the turning angle of the boom 7.

In addition, as described above, the boom 7 is expandable and contractible by the actuator (see arrow B in FIG. 1). In the present application, such an actuator is defined as a hydraulic cylinder for expansion and contraction 42 (see FIG. 1). The hydraulic cylinder for expansion and contraction 42 is appropriately operated by a valve for expansion and contraction 32 that is a direction control valve. That is, the hydraulic cylinder for expansion and contraction 42 is appropriately operated by the valve for expansion and contraction 32 switching the flow direction of the hydraulic oil. Note that the valve for expansion and contraction 32 is operated on the basis of the operation of an expansion and contraction operation tool 22 by the operator. In addition, an expansion and contraction length of the boom 7 is detected by a sensor for expansion and contraction 52. Therefore, the control device 20 can recognize the expansion and contraction length of the boom 7.

Furthermore, as described above, the boom 7 can be raised and lowered by the actuator (see arrow C in FIG. 1). In the present application, such an actuator is defined as a hydraulic cylinder for derricking 43 (see FIG. 1). The hydraulic cylinder for derricking 43 is appropriately operated by a valve for derricking 33 that is a direction control valve. That is, the hydraulic cylinder for derricking 43 is appropriately operated by the valve for derricking 33 switching the flow direction of the hydraulic oil. Note that the valve for derricking 33 is operated on the basis of the operation of a derricking operation tool 23 by the operator. In addition, a derricking angle of the boom 7 is detected by a sensor for derricking 53. Therefore, the control device 20 can recognize the derricking angle of the boom 7.

In addition, as described above, the hook 10 is movable up and down by the actuator (see arrow D in FIG. 1). In the present application, such an actuator is defined as a hydraulic motor for winding 44 (see FIG. 1). The hydraulic motor for winding 44 is appropriately operated by a valve for winding 34 that is a direction control valve. That is, the hydraulic motor for winding 44 is appropriately operated by the valve for winding 34 switching the flow direction of the hydraulic oil. Note that the valve for winding 34 is operated on the basis of the operation of a winding operation tool 24 by the operator. In addition, a suspension length of the hook 10 is detected by a sensor for winding 54. Therefore, the control device 20 can recognize the suspension length of the hook 10.

In addition, a camera 55, a global navigation satellite system (GNSS) receiver 56 and a communication device 61 are connected to the control device 20.

The camera 55 is a device that captures a video. The camera 55 is attached to a distal end portion of the boom 7. The camera 55 photographs the load W and a feature or topography around the load W from vertically above the load W. Note that the camera 55 is connected to the control device 20. Therefore, the control device 20 can acquire the video captured by camera 55.

The GNSS receiver 56 is a receiver constituting a Global navigation satellite system and is a device that receives a distance measuring radio wave from a satellite and calculates latitude, longitude, and altitude that are position coordinates of the receiver. The GNSS receiver 56 is provided on the distal end portion of the boom 7 and the cabin 11. The GNSS receiver 56 calculates position coordinates of the distal end portion of the boom 7 and the cabin 11. Note that the GNSS receiver 56 is connected to the control device 20. Therefore, the control device 20 can acquire the position coordinates calculated by the GNSS receiver 56. In addition, the control device 20 can recognize position coordinates of the load N on the basis of position coordinates of the distal end portion of the boom 7 and the suspension length. Furthermore, the control device 20 can recognize an orientation of the boom 7 with reference to the vehicle 2 from the position coordinates of the distal end portion of the boom 7 and the position coordinates of the cabin 11.

The communication device 61 is a device that communicates with an external server and the like. The communication device 61 is provided on the cabin 11. The communication device 61 is configured to acquire spatial information of a work area Few to be described later, information regarding work, and the like from the external server and the like. Note that the communication device 61 is connected to the control device 20. Therefore, the control device 20 can acquire information via the communication device 61.

Next, generation of a transport path CR of the load W will be described with reference to FIGS. 3A and 3B and FIG. 4. In order to facilitate understanding of the concept of path generation of the present application, the transport path CR generated by turning, expansion and contraction, and derricking of the boom 7 will be described. In the following description, machine body information is performance specification data of the crane 1. The information regarding work is information regarding a lifting-up point Ps of the load W, a lifting-down point Pe of the load W, a weight of the load W, and the like. Transport path information is a transport path, a transport speed, and the like of the load W. The spatial information of the work area Aw is three-dimensional information of a feature or the like in the work area Aw.

The control device 20 sets a workable range Ar from the weight of the load W to be transported. Specifically, the control device 20 acquires the weight of the load W that is the information regarding work and the performance specification data of the crane 1 that is the machine body information from the external server and the like via the communication device 61. Furthermore, the control device 20 calculates the workable range Ar that is a space in which the crane 1 can transport the load W from the weight of the load W and the performance specification data of the crane 1.

Figure 3A:
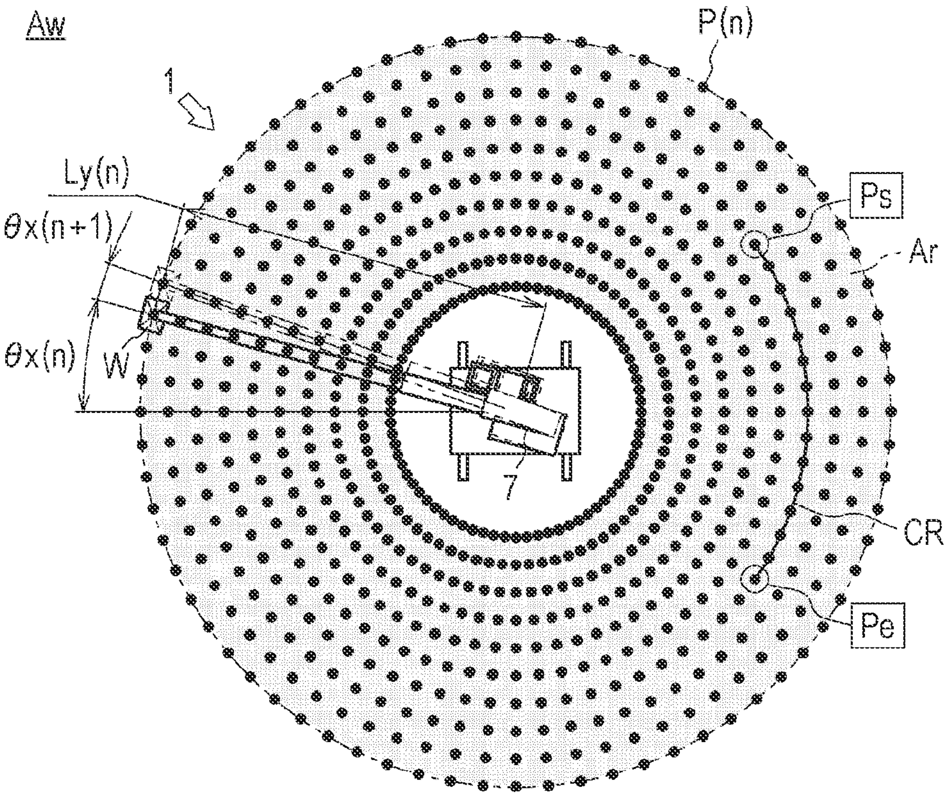
Figure 3B:
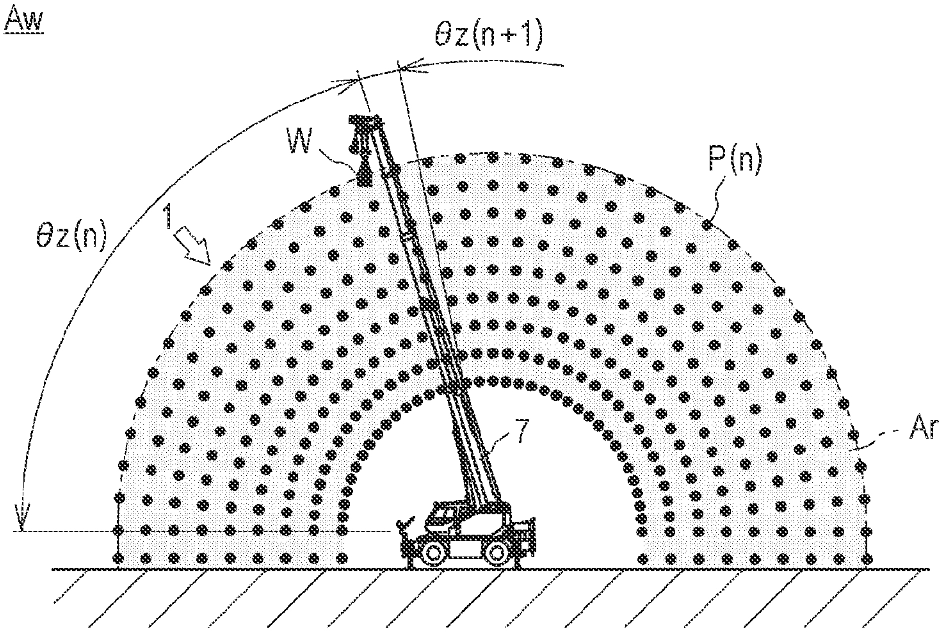
FIG. 3B is a diagram illustrating the arrangement of node points s as viewed from a side of the crane.
Figure 4:
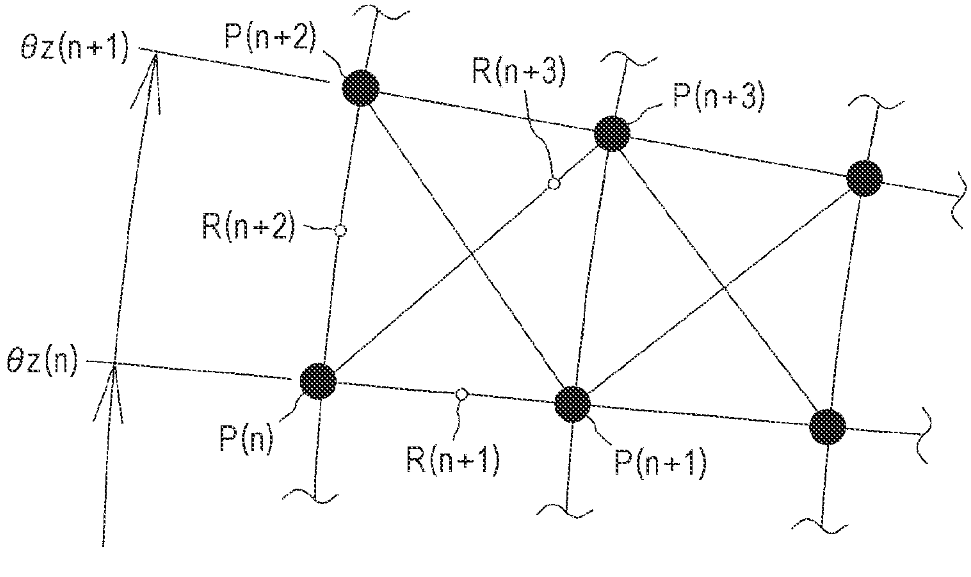
FIG. 4 is a diagram illustrating node points and paths at any turning angle.

As illustrated in FIGS. 3A and 3B and FIG. 4, the control device 20 generates all candidate paths R(n) constituting the transport path CR within the workable range Ar (n is any natural number). The path R(n) connects a plurality of node points P(n).

Note that the node points P(n) are not arranged in an area of the feature recognized on the basis of the spatial information of the work area Aw.

The control device 20 arranges the node points P(n) in a case where the boom 7 at a position of any turning angle θx(n) and any derricking angle θz(n) is expanded and contracted in any boom length increments in the entire range of the boom length Ly(n) that is expandable and contractible. Next, the control device 20 arranges, in the entire range of the boom length Ly(n) that is expandable and contractible, the node points P(n) in a case where the boom 7 at a position of any turning angle θx(n+1) different by any turning angle increment and any derricking angle θz(n) is expanded and contracted in any boom length increments. As described above, the control device 20 arranges, in any turning angle increments in the entire range of the turning angle vx(n) that allows turning, the node points P(n) in a case where the boom 7 at a position of any derricking angle θz(n) is expanded and contracted.

Similarly, the control device 20 arranges, in any turning angle increments in the entire range of the turning angle θx(n) that allows turning, the node points P(n) in a case where the boom 7 at a position of any derricking angle θz(n+1) different by any derricking angle increment is expanded and contracted in any boom length increments. As described above, the control device 20 arranges the node points P(n) in any turning angle increments in the entire range of the turning angle θx(n) that allows turning, in any boom length increments in the entire range of the boom length Ly(n) that is expandable and contractible, and in any derricking angle increments in the entire range of the derricking angle θz(n). As a result, the node points P(n) at any turning angle θx(n), any boom length Ly(n), and any derricking angle θz(n) of the boom 7 are arranged in any turning angle increments, any boom length increments, and any derricking angle increments within the workable range Ar.

As illustrated in FIG. 4, the control device 20 specifies a plurality of other node points P(n+1), P(n+2), . . . adjacent to any one node point P(n) as candidate points through which the load W passes. The control device 20 generates paths R(n), R(n+1), . . . from one node point P(n) to a plurality of other adjacent node points P(n+1), P(n+2), . . . . The control device 20 generates the path R(n) between all the node points P(n), thereby generating a path network that covers the space in the workable range Ar. The path R(n) is generated at any turning angle θx(n), any expansion and contraction length Ly(n), and any derricking angle θz(n). Here, the path R(n) at any turning angle θx(n) will be described in detail.

The control device 20 generates paths connecting the node point P(n) and the node point P(n+1) arranged at any turning angle θx(n) in order in which the boom 7 at the derricking angle θz(n) is contracted in any boom length increments and the node point P(n+2) and the node point P(n+3) arranged in order in which the boom 7 at the derricking angle θz(n+1) is contracted in any boom length increments. The path R(n+1) connecting the node point P(n) and the node point P(n+1) is a path through which the load W passes by expansion and contraction of the boom 7. The path R(n+2) connecting the node point P(n) and the node point P(n+2) is a path through which the load W passes by derricking of the boom 7. The path R(n+3) connecting the node point P(n) and the node point P(n+3) is a path through which the load h passes by expansion and contraction and derricking of the boom 7.

A path through which the load W passes by turning and derricking of the boom 7 at any expansion and contraction length Ly(n), and a path through which the load W passes by turning and expansion and contraction of the boom 7 at any derricking angle θz(n) are similarly generated by connecting adjacent node points P(n). A plurality of paths R(n) generated in this manner includes a path of the load W transported by a single motion of each of turning, expansion and contraction, and derricking of the boom 7, and a path of the load W transported by a combination of a plurality of motions of turning, expansion and contraction, and derricking.

The control device 20 selects actuators (hydraulic motor for turning 41, hydraulic cylinder for expansion and contraction 42, and hydraulic cylinder for derricking 43) to be operated on the basis of priority order. Then, the control device 20 generates the transport path CR which satisfies predetermined conditions and through which the load W passes by the operation of the selected actuator. The transport path CR includes a plurality of paths R(n). That is, the transport path CR is generated by connecting the node points P(n). The priority order is for selecting an operation to be preferentially selected among turning, derricking, and expansion and contraction. The predetermined conditions are to minimize the transport time of the load W, to decrease a turning radius at the time of transporting the load W, to minimize a cost (fuel consumption) of the actuator, to set restrictions on a height at the time of transporting the load W and an entry prohibition area, and the like. The control device 20 generates the transport path CR by selecting the path R(n) which satisfies the predetermined conditions and through which the load W passes by the operation of the selected actuator. The control device 20 controls the actuator so that the load W passes through the transport path CR and transports the load W from the lifting-up point Ps to the lifting-down pomp Pe.

Note that the control device 20 can generate the node point P(n) in any increments in feeding in and feeding out of the winch 9 and tilting and expansion and contraction of a jib attached to the distal end portion of the boom 7. That is, the crane 1 can generate the path R(n) and the transport path CR on the basis of the feeding in and feeding out of the wire rope 8 and the tilting and expansion and contraction of the jib.

Next, generation of the transport path CR when the obstacle has moved will be described with reference to FIGS. 5A to 8B. It is assumed that the control device 20 has already generated the transport path CR of the load W. It is assumed that a worker X moves so as to approach the transport path CR within the workable range Ar. The worker X is an example of an obstacle that moves and is not limited thereto.

The control device 20 analyzes the video captured by the camera 55 for each frame, and detects movement of the worker X. The control device 20 can detect position coordinates, a moving direction, and a moving speed of the worker X by using, for example, a background difference and an optical flow. In addition, the camera 55 is an example of a sensor that detects movement of an obstacle and is not limited thereto. Note that instead of generating the transport path CR on the condition that the obstacle has moved, the transport path CR may be generated on the condition that the obstacle has approached the transport path CR or the obstacle has moved in an area within a predetermined distance from the transport path CR.

Figure 5A:
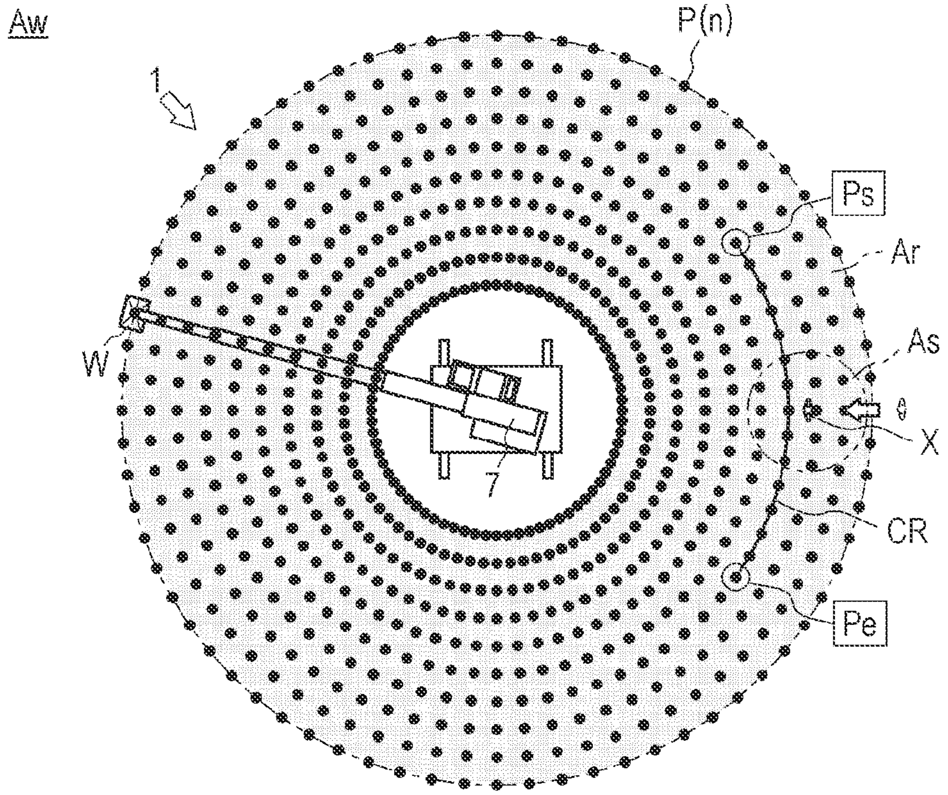
FIGS. 5A and 5B are diagrams illustrating a specific area.
Figure 5B:
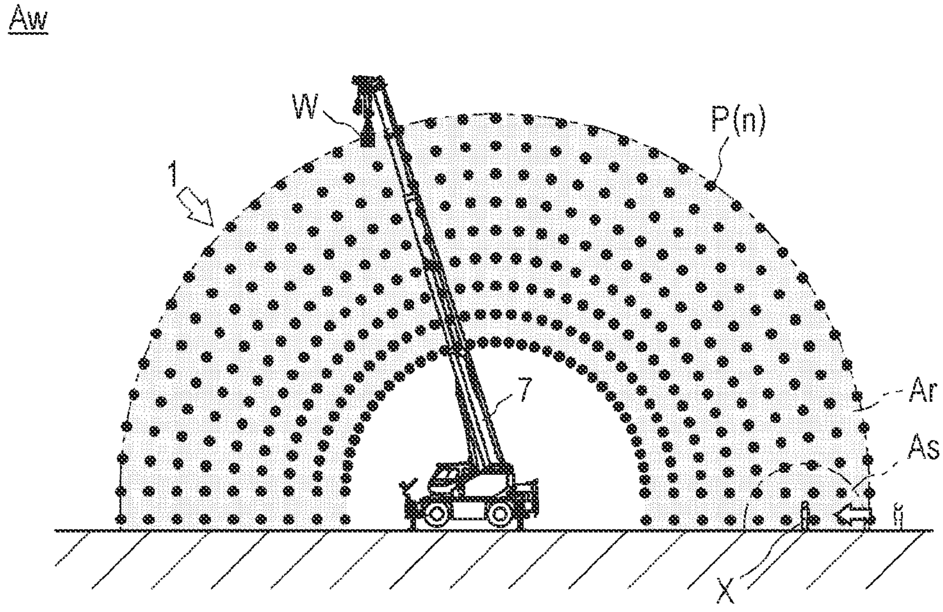

As illustrated in FIGS. 5A and 5B, the control device 20 sets a specific area As from the position coordinates of the worker X. The specific area As is a substantially hemispherical area centered on the worker X. The size of the specific area As (the radius of a hemisphere) is preset and can be optionally changed. Note that the size of the obstacle that moves may be detected by image recognition from the video captured by the camera 55, and the size of the specific area As may be increased as the obstacle becomes larger. In addition, a shape of the specific area As is not limited to a substantially hemispherical shape centered on the obstacle and may be set to any shape including the obstacle.

Figure 6A:
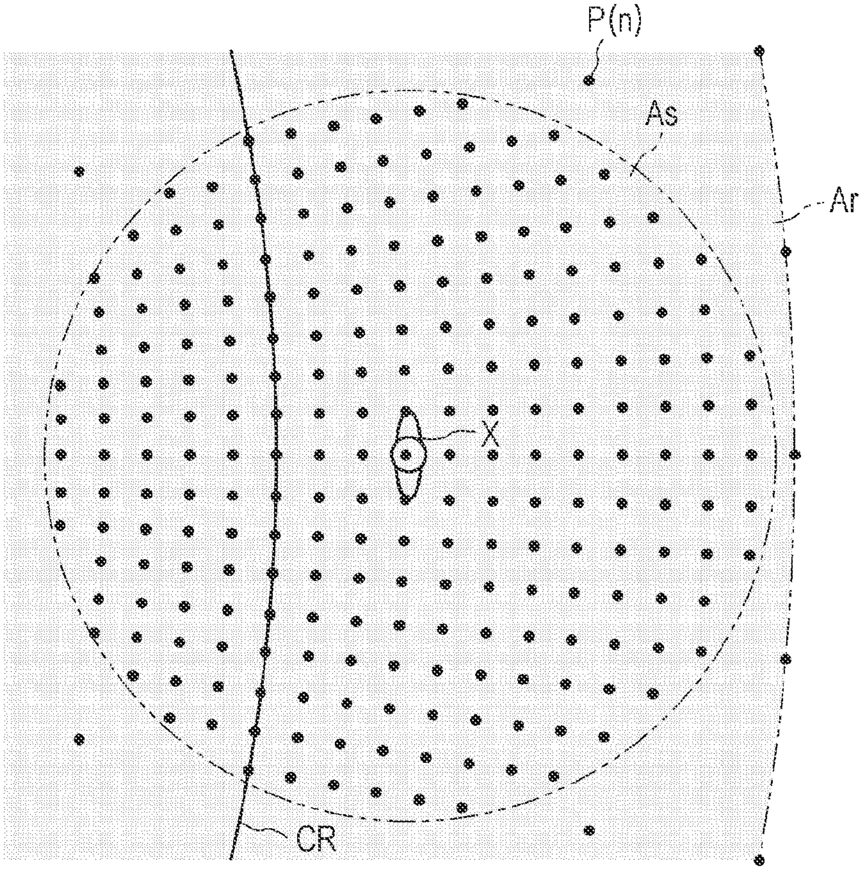
FIGS. 6A and 6B are diagrams illustrating an arrangement of node points.
Figure 6B:
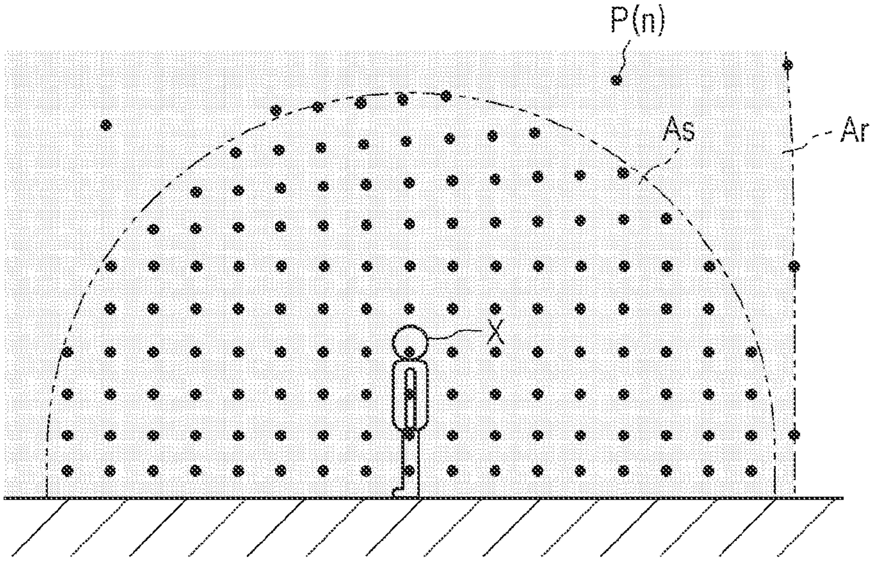
Figure 7A:
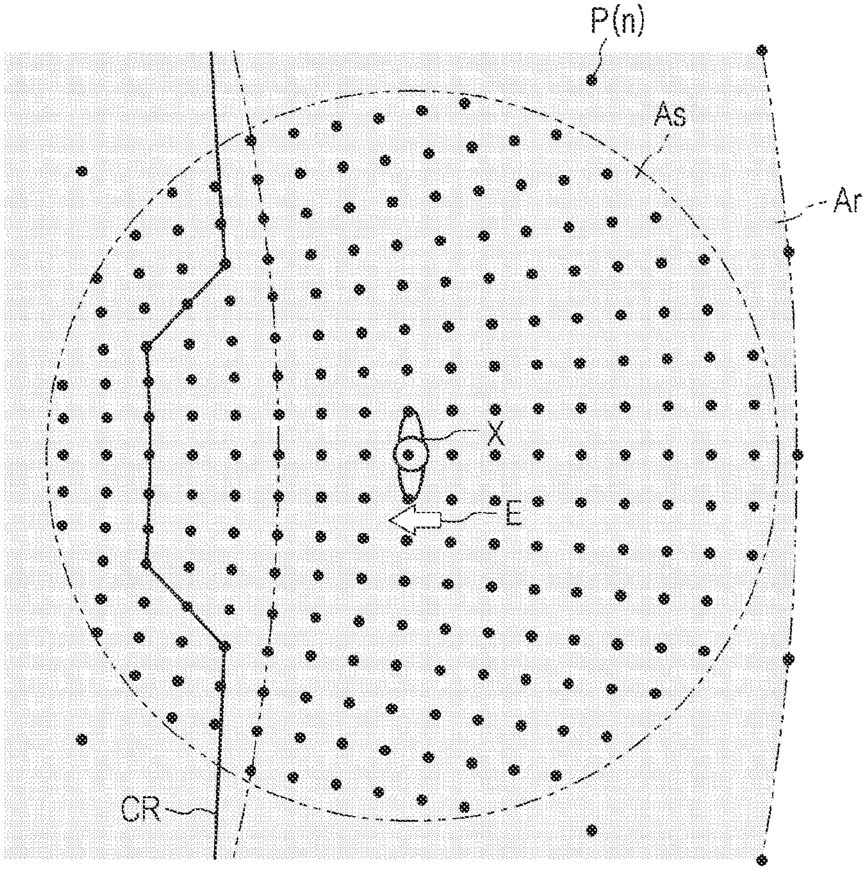
FIGS. 7A and 7B are diagrams illustrating a selectable transport path.
Figure 7B:
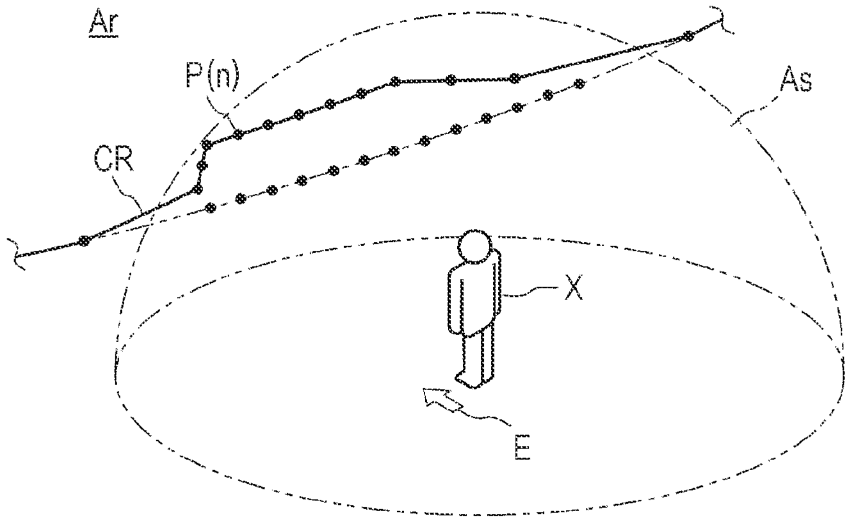
Figure 8A:
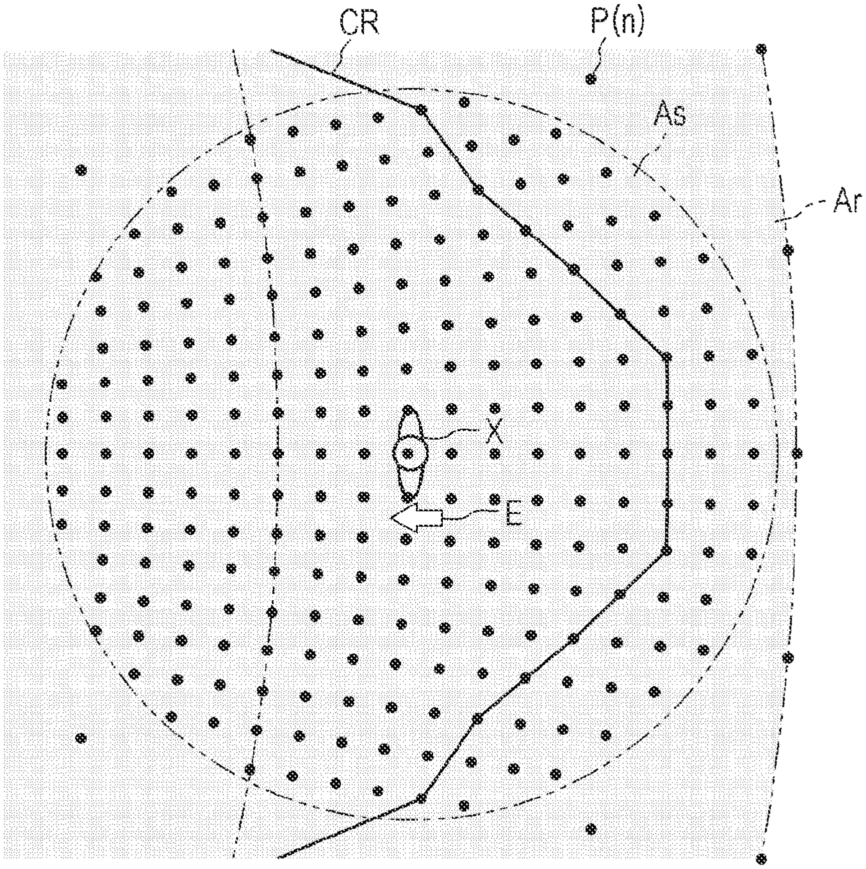
FIGS. 8A and 8B are diagrams illustrating a selectable transport path.
Figure 8B:
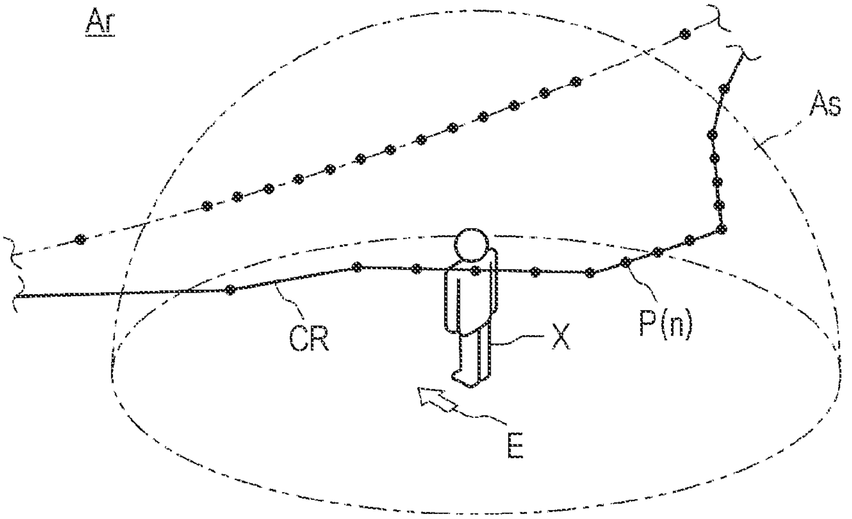

As illustrated in FIGS. 6A and 6B, the control device 20 increases the number of node points P(n) arranged inside the specific area As. The control device 20 calculates any turning angle increment, any boom length increment, any turning angle increment obtained by decreasing values of any derricking angle increment, any boom length increment, and any derricking angle increment by predetermined proportions, respectively.

The number of node points P(n) arranged inside the specific area As increases as the values of angle increment, any boom length increment, and any derricking angle increment are decreased. The control device 20 arranges the node points P(n) inside the specific area As in any turning angle increments, any boom length increments, and any derricking angle increments whose values have been decreased by the predetermined proportions. Then, the control device 20 generates paths R(n) (see FIG. 4) between all the node points P(n). Inside the specific area As, the density of the paths R(n) per unit volume becomes higher and the length of the path R(n) becomes shorter than before the number of node points P(n) is increased.

As illustrated in FIGS. 7A and 7B and FIGS. 8A and 8B, the control device 20 can select a transport path CR passing through the node points P(n) inside the specific area As. Since the number of combinations of the paths R(n) constituting the transport path CR increases inside the specific area As, the number of selectable transport paths CR increases. The control device 20 can select an appropriate transport path CR from these transport paths CR. In addition, the transport path CR includes a path R(n) shorter than before the number of node points P(n) is increased.

Therefore, the control device 20 can select a transport path CR more suitable for avoiding the worker X than before the number of node points P(n) is increased. That is, the control, device 20 can select a transport path CR that avoids the worker X on a moving direction side (see moving direction E) of the worker X (see FIGS. 7A and 7B) In addition, the control device 20 can select a transport path CR that wraps around to the opposite side of the moving direction E of the worker X and avoids the worker X (see FIGS. 8A and 8B). The control device 20 generates the transport path CR that avoids the worker X, controls the actuators (hydraulic motor for turning 41, hydraulic cylinder for expansion and contraction 42, hydraulic cylinder for derricking 43, and hydraulic motor for winding 44) so that the load W passes through the transport path CR, and transports the load W from the lifting-up point Ps to the lifting-down point Pe.

As described above, the crane 1 is equipped with the sensor (camera 55) that detects the position of the obstacle (worker X) and the control device 20 that arranges a plurality of node points P(n) in an area including the lifting-up point Ps and the lifting-down point Pe of the load W and connects the node points P(n) to generate the transport path CR. Then, when the sensor (55) detects movement of the obstacle (X), the control device 20 generates a new transport path CR after increasing the number of node points P(n) arranged around the obstacle (X). Such a crane 1 increases the degree of freedom in selecting a transport path CR around the obstacle (X) and enables selection of an appropriate transport path CR. As a result, it is possible to generate a transport path CR capable of avoiding the obstacle (X) even if the obstacle (X) moves.

More specifically, in the crane 1, the control device 20 increases the number of node points P(n) inside the substantially hemispherical specific area As including the obstacle (worker X). Such a crane 1 increases the degree of freedom in selecting a transport path CR around the obstacle (X) and enables selection of an appropriate transport path CR. As a result, it is possible to generate a transport path CR capable of avoiding the obstacle (X) even if the obstacle (X) moves.

Next, a crane 1 according to a second embodiment will be described with reference to FIGS. 9A and 9B, and FIGS. 10A and 10B. Hereinafter, the same names and reference numerals used in the description of the crane 1 according to the first embodiment are used to indicate the same. Here, differences from the crane 1 according to the first embodiment will be mainly described. It is assumed that a worker moves to immediately below a transport path CR within a workable range Ar.

Figure 9A:
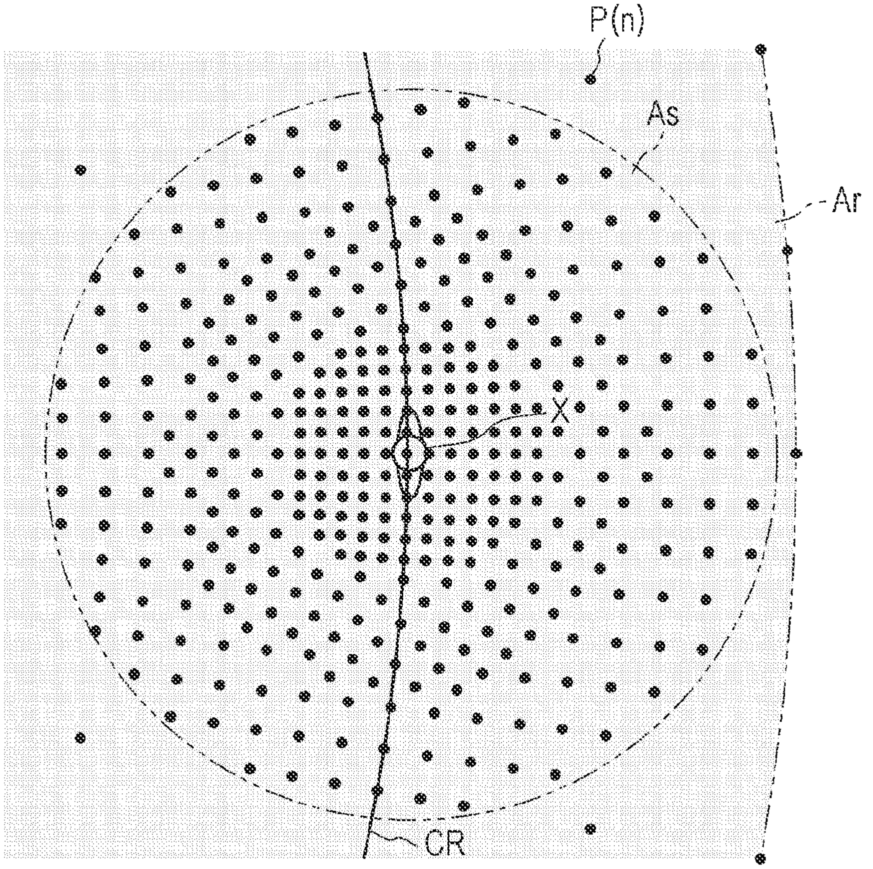
FIGS. 9A and 9B are diagrams illustrating an arrangement of node points.
Figure 9B:
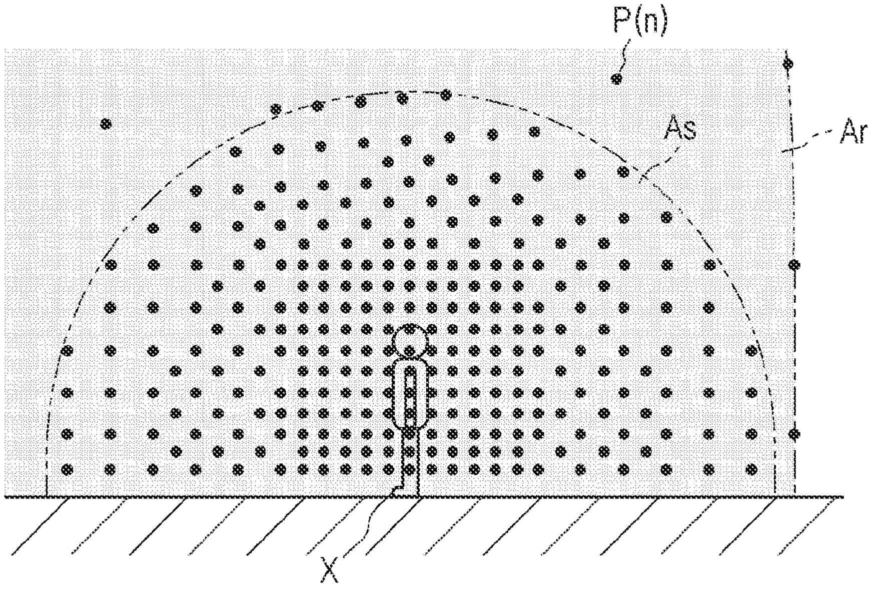

As illustrated in FIGS. 9A and 9B, the control device 20 increases the number of node points P(n) arranged inside the specific area As. The control device 20 decreases the above-mentioned predetermined proportions as approaching the worker X, thereby decreasing the values of any turning angle increment, any boom length increment, and any derricking angle increment as a position approaches the worker X. The control device 20 arranges the node points P(n) inside the specific area As in any turning angle increments, any boom length increments, and any derricking angle increments whose values have been decreased as the control device 20 approaches the worker X. That is, the control device 20 arranges the node points P(n) by increasing the density of the node points P(n) per unit volume as approaching the worker X.

Figure 10A:
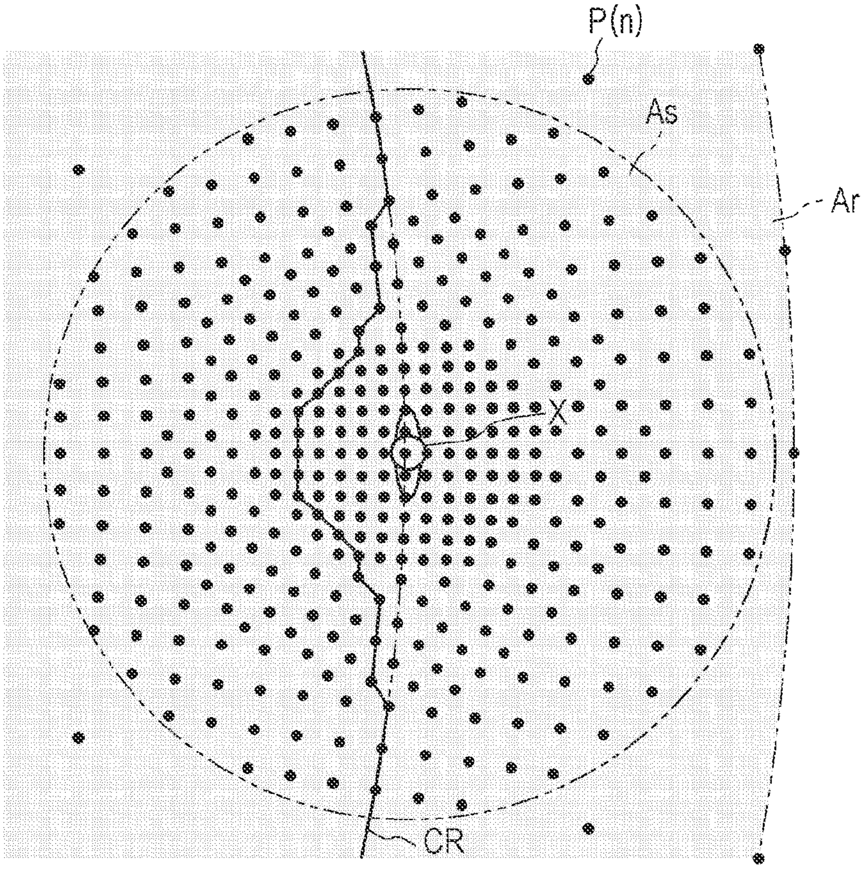
FIGS. 10A and 10B are diagrams illustrating a selectable transport path.
Figure 10B:
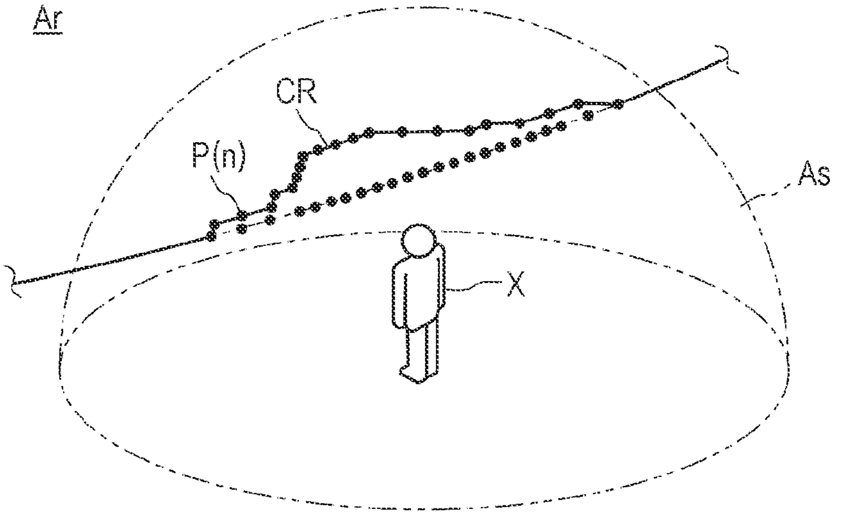

As illustrated in FIGS. 10A and 10B, the control device 20 can select a transport path CR passing through the node points P(n) inside the specific area As. Since the number of combinations of the paths R(n) constituting the transport path CR increases as a position approaches the worker X (as a collision between the load W and the worker X becomes more likely to occur), the number of selectable transport paths CR increases. The control device 20 can select an appropriate transport path CR from these transport paths CR. In addition, the transport path CR includes a path R(n) that is shorter as a position approaches the worker X. Therefore, the control device 20 can select a transport path CR more suitable for avoiding the worker X than before the number of node points P(n) is increased.

As described above, in the crane 1, the control device 20 increases the density of the node points P(n) as approaching the obstacle (worker X). Such a crane 1 increases the degree of freedom in selecting a transport path CR as a collision between the load W and the obstacle (X) is likely to occur and enables selection of an appropriate transport path CR. As a result, it is possible to generate a transport path CR capable of avoiding the obstacle (X) even if the obstacle moves.

Neat, a crane 1 according to a third embodiment will be described with reference to FIGS. 11A and 11B, and FIGS. 12A and 12B. Also here, differences from the crane 1 according to the first embodiment will be mainly described.

Figure 11A:
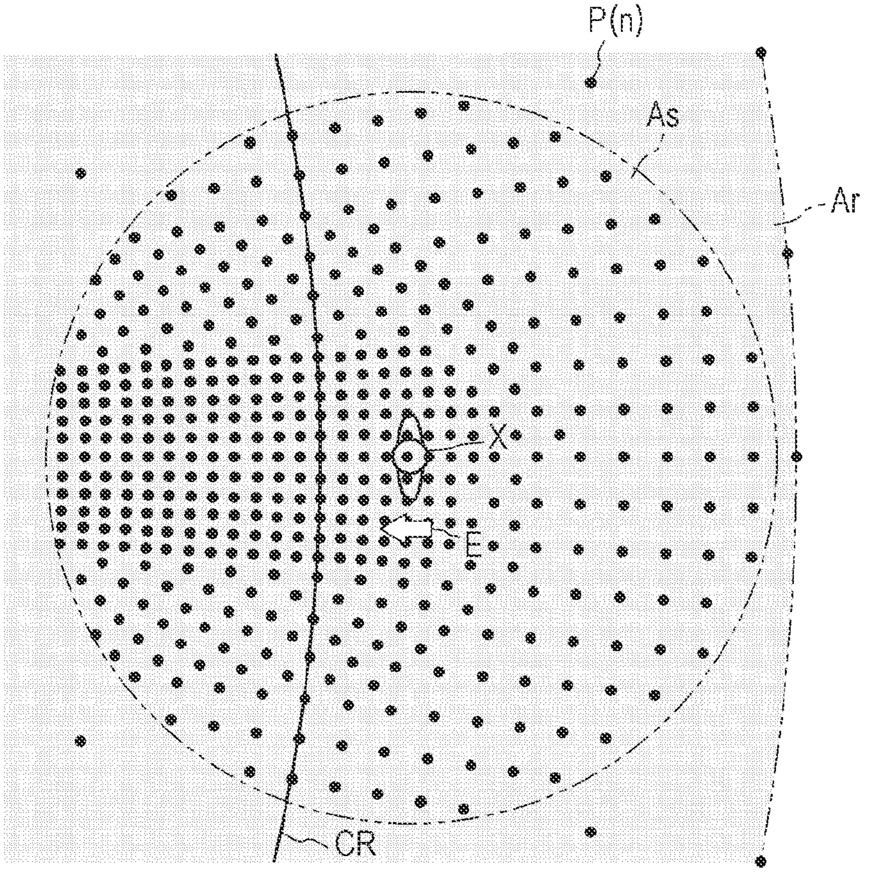
FIGS. 11A and 11B are diagrams illustrating an arrangement of node points.
Figure 11B:
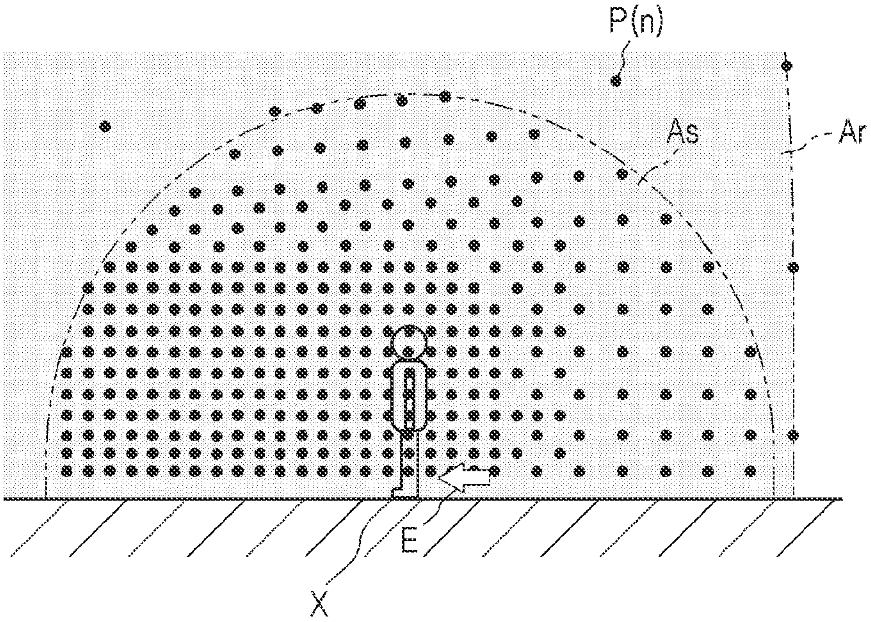

As illustrated in FIGS. 11A and 11B, a control device 20 increases the number of node points P(n) arranged inside a specific area As. The control device 20 decreases the above-described predetermined proportions as approaching a moving direction side of a worker X (see moving direction E), thereby decreasing the values of any turning angle increment, any boom length increment, and any derricking angle increment as a position approaches the moving direction side of the worker X. The control device 20 arranges the node points P(n) in any turning angle increments, any boom length increments, and any derricking angle increments whose values have been decreased as a position approaches the moving direction side of the worker X inside the specific area As. That is, the control device 20 arranges the node points P(n) by increasing the density of the node points P(n) per unit volume as approaching the moving direction side of the worker X.

Figure 12A:
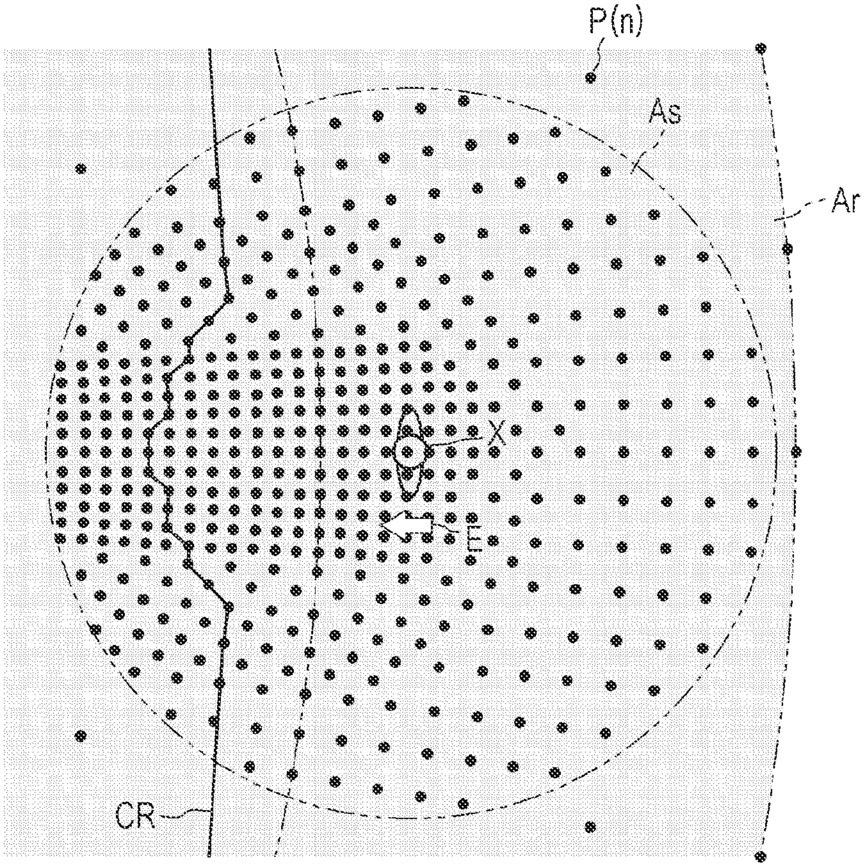
FIGS. 12A and 12B are diagrams illustrating a selectable transport path.
Figure 12B:
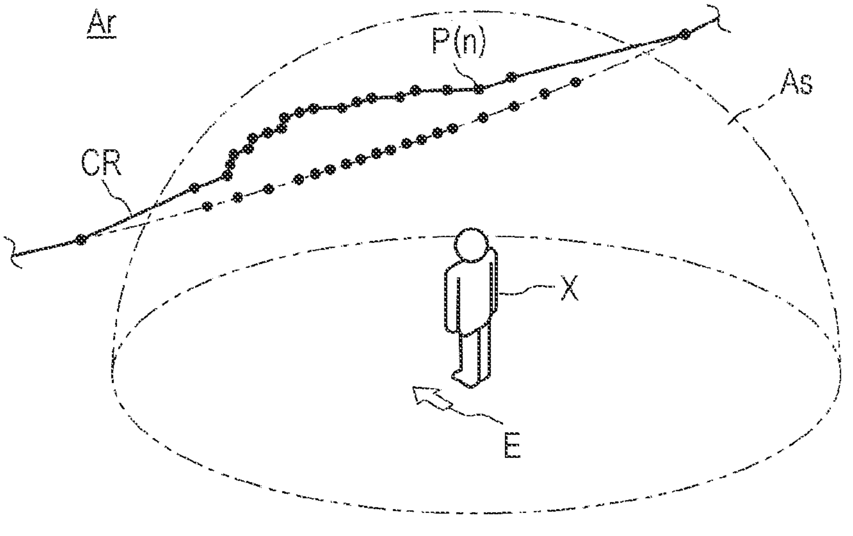

As illustrated in FIGS. 12A and 12B, the control device 20 can select a transport path CR passing through the node points P(n) inside the specific area As. Since the number of combinations of the paths R(n) constituting the transport path CR increases as a position approaches the moving direction side (see moving direction E) of the worker X (as a collision between a load W and the worker X is more likely to occur), the number of selectable transport paths CR increases. Therefore, the control device 20 can select an appropriate transport path CR from these transport paths CR. In addition, the transport path CR includes a path R(n) that is shorter as a position approaches the moving direction side of the worker X. Therefore, the control device 20 can select a transport path CR more suitable for avoiding the worker X than before the number of node points P(n) is increased.

As described above, in the crane 1, the control device 20 increases the density of the node points P(n) as approaching the moving direction side of the obstacle (worker X). Such a crane 1 increases the degree of freedom in selecting a transport path CR as a collision between the load h and the obstacle (X) is likely to occur and enables selection of an appropriate transport path CR. As a result, it is possible to generate a transport path CR capable of avoiding the obstacle (X) even if the obstacle (X) moves.

Next, a crane 1 according to a fourth embodiment will be described with reference to FIGS. 13A and 13B, and FIGS. 14A and 14B. Also here, differences from the crane 1 according to the first embodiment will be mainly described.

Figure 13A:
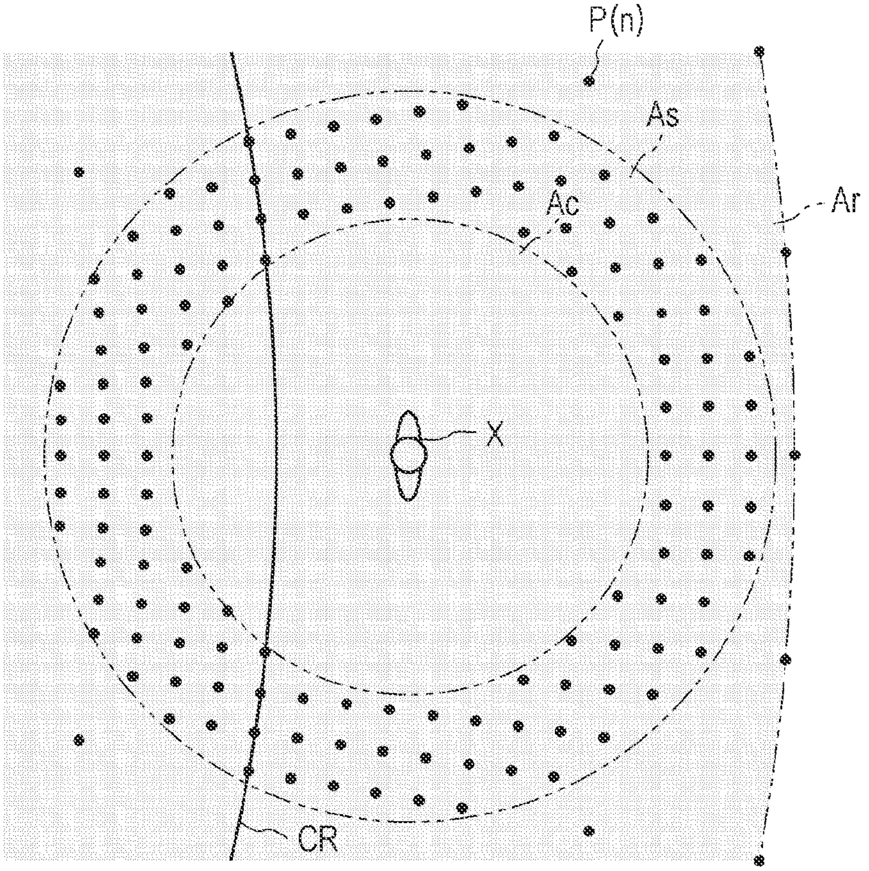
FIGS. 13A and 13B are diagrams illustrating a safety area.
Figure 13B:
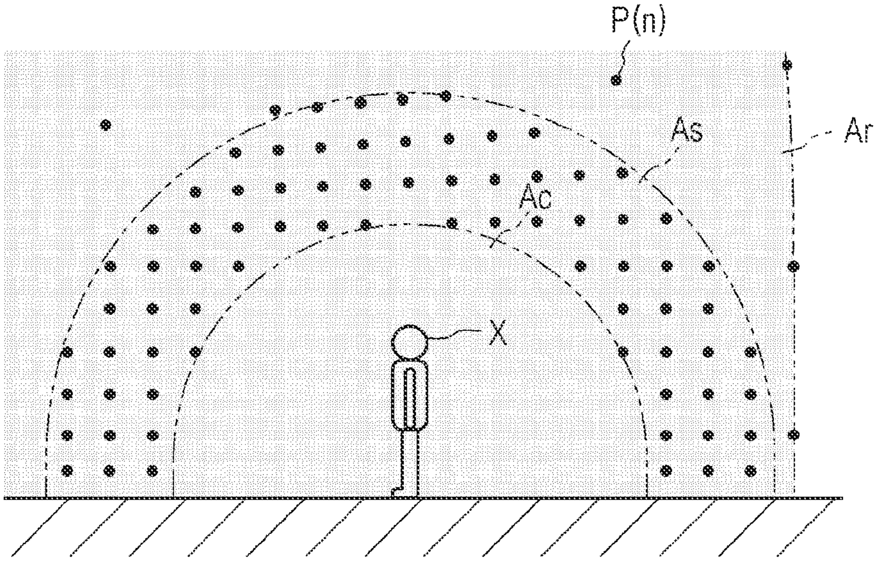

As illustrated is FIGS. 13A and 13B, a control device 20 sets a safety area Ac from position coordinates of a worker X. The safety area Ac is a substantially hemispherical area centered on the worker X, and is set inside a specific area As. The size of the safety area Ac (the radius of a hemisphere) is preset and can be optionally changed. Note that the size of an obstacle that moves may be detected by image recognition from a video captured by a camera 55, and the size of the safety area Ac may be increased as the obstacle becomes larger.

In addition, a shape of the safety area Ac is not limited to a substantially hemispherical shape centered on the obstacle and may be set to any shape including the obstacle.

The control device 20 increases the number of node points P(n) arranged outside the safety area Ac and inside the specific area As. The control device 20 does not arrange the node points P(n) inside the safety area Ac.

Figure 14A:
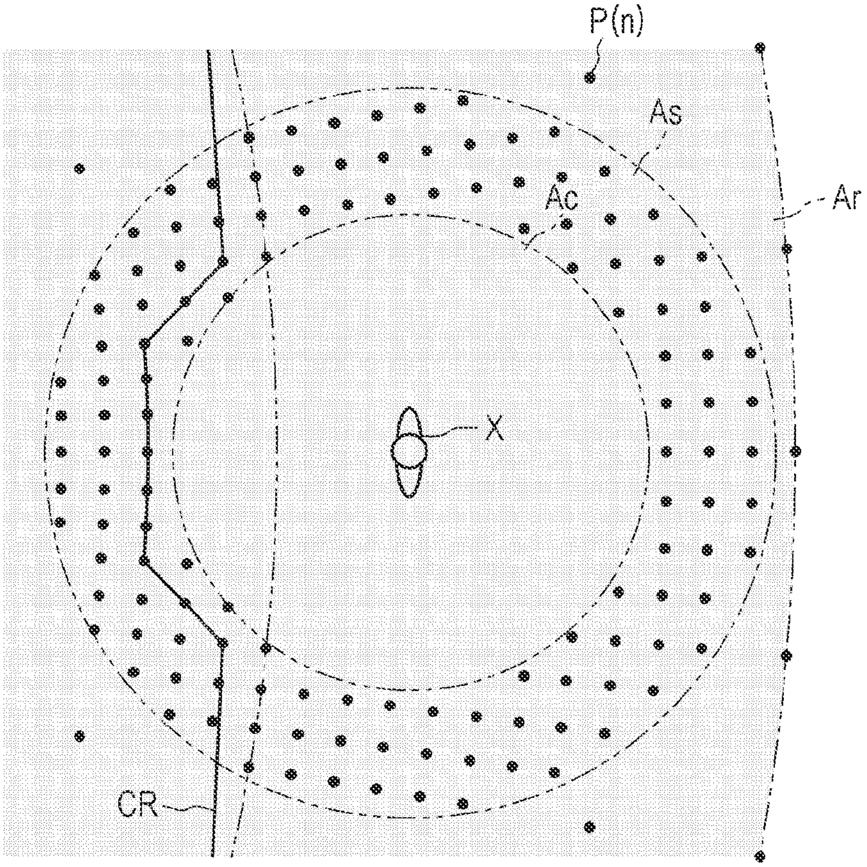
FIGS. 14A and 14B are diagrams illustrating a selectable transport paths.
Figure 14B:
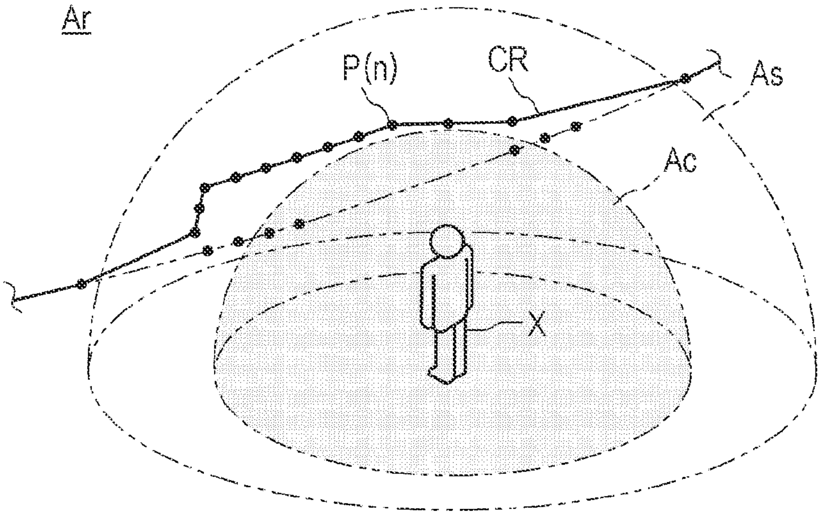

As illustrated in FIGS. 14A and 14B, the control device 20 can select a transport path CR passing through the node points P(n) outside the safety area Ac and inside the specific area As. Since the node points P(n) are not arranged inside the safety area Ac, a transport path CR passing inside the safety area Ac is excluded from selectable transport paths CR. The control device 20 selects a transport path CR in which a distance from a load W to the worker X is a certain distance or more from selectable transport paths CR outside the safety area Ac and inside the specific area As.

As described above, in the crane 1, the control device 20 sets the substantially hemispherical safety area Ac including the obstacle (worker X) inside the specific area As and does not arrange the node point P(n) inside the safety area Ac in such a crane 1, a transport path CR in which the distance from the load W to the obstacle (X) is a certain distance or more is selected. As a result, it is possible to generate a transport path CR capable of avoiding the obstacle (X) even if the obstacle moves.

Figure 15:
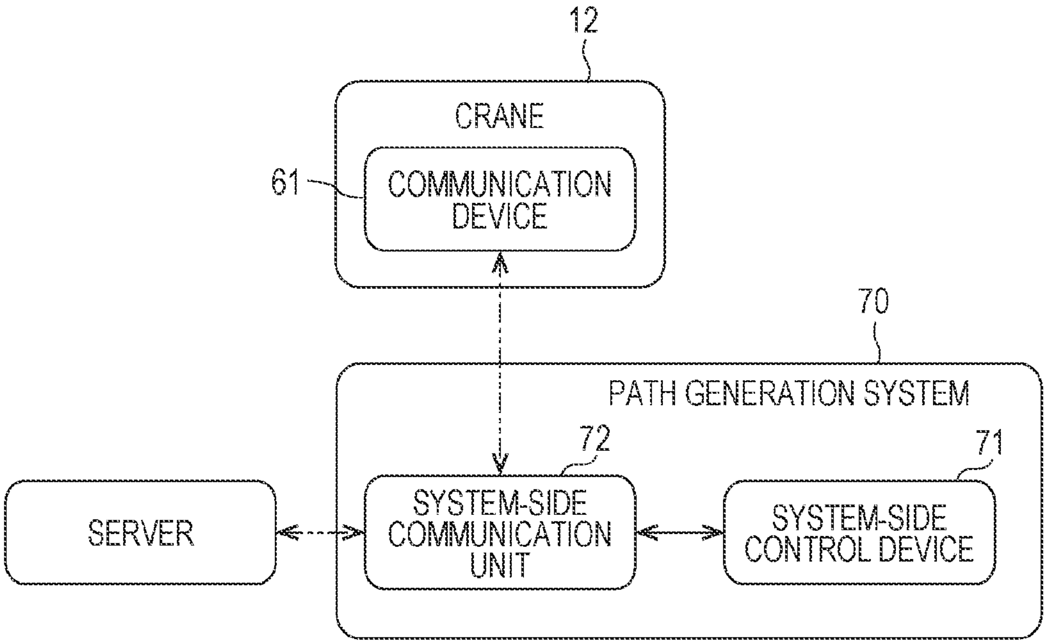
FIG. 15 is a diagram illustrating a path generation system.

Next, a path generation system 70 will be described with reference to FIG. 15. The path generation system 70 is provided in an external facility such as a data center.

A crane with which the path generation system 70 communicates information is a crane 12. The crane 12 is different from the crane 1 in that the crane 12 does not generate a transport path CR.

The path generation system 70 includes a system-side control device 71. A system-side communication unit 72 is connected to the system-side control device 71.

The system-side communication unit 72 is a device that communicates with a communication device 61 of the crane 12, an external server, or the like. The system-side communication unit 72 is configured to acquire a video of a camera 55 (position information of an obstacle) from the communication device 61 and transmit information to the communication device 61. The system-side communication unit 72 is configured to acquire spatial information of a work area Aw, information regarding work, and the from an external server and the like. Note that the system-side communication unit 72 is connected to the system-side control device 71. Therefore, the system-side control device 71 can acquire information and a video via the system-side communication unit 72. In addition, the system side control device 71 can transmit information to the communication device 61 via the system-side communication unit 72.

Similarly to the control device 20 of the crane 1, the system-side control device 71 generates a transport path CR when the obstacle has moved. The generated transport path CR is transmitted to the crane 12 via the system-side communication unit 72. The crane 12 controls actuators (hydraulic motor for turning 41, hydraulic cylinder for expansion and contraction 42, hydraulic cylinder for derricking 43, and hydraulic motor for winding 44) so as to pass through the transmitted transport path CR and transports a load W from a lifting-up point Ps to a lifting-down point Pe.

As described above, it is possible to configure a system that is connected to the control device 20 of the crane 12 via the communication device 61 and acquires necessary information and a video from the crane 12 to generate a transport path CR similar to those of the above-described embodiments and transmit the generated transport path CR to the crane 12.

As described above, the path generation system 70 is equipped with the system-side communication unit 72 that communicates with the communication device 61 and the system-side control device 71 that arranges a plurality of node points P(n) in an area including the lifting-up point Ps and the lifting-down point Pe of the load W and connects the node points P(n) to generate the transport path CR. Then, when a sensor (camera 55) detects movement of the obstacle (worker X), the system-side control device 71 generates a new transport path CR after increasing the number of node points P(n) arranged around the obstacle (X). Such a path generation system 70 increases the degree of freedom in selecting a transport path CR around the obstacle and enables selection of an appropriate transport path CR. As a result, it is possible to generate a transport path CR capable of avoiding the obstacle (X) even if the obstacle (X) moves.

The above-described embodiments are merely representative forms, and various modifications can be made without departing from the gist of one embodiment. It is a matter of course that the present invention can be implemented in various forms, and the scope of the present invention is indicated by the description of claims and further includes equivalent meanings described in the claims and all modifications within the scope.

INDUSTRIAL APPLICABILITY

The present invention relates to a crane and a path generation system. Specifically, the present invention can be used for a crane and a path generation system that can generate a transport path capable of avoiding an obstacle even if the obstacle moves.

REFERENCE SIGNS LIST

1 Crane
2 Vehicle
3 Crane device
7 Boom
8 Wire rope
10 Hook
12 Crane
20 Control device
55 Camera (sensor)
61 Communication device
70 Path generation system
71 System-side control device
72 System-side communication unit
Ac Safety area
As Specific area
CR Transport path
E Moving, direction
Pe Lifting-down point
Ps Lifting-up point
P(n) Node point
X worker (obstacle)
W Load

The invention claimed is:

1. A path generation system for generating a transport path of a load to be transported by a crane including:
a sensor; and
a communication device configured to communicate position information of an obstacle detected by the sensor, wherein
the path generation system further comprises:
a system-side communication unit configured to communicate with the communication device; and
a system-side control device configured to
generate a transport path by arranging a plurality of node points in an area including a lifting-up point and a lifting-down point of the load and connecting the node points, and
transmit the generated transport path via the system-side communication unit to make the crane move such that the load passes through the transmitted transport path, and
when the sensor detects movement of the obstacle, the system-side control device generates a new transport path after increasing a number of node points arranged around the obstacle.

2. A crane comprising:
a boom;
an actuator configured to move the boom; and
a hook suspended from the boom by a wire rope, wherein
the crane is configured to transport a load in a state in which the load is suspended from the hook,
the crane further comprises:
a sensor configured to detect a position of an obstacle; and
a control device configured to generate a transport path by arranging a plurality of node points in an area containing a lifting-up point and a lifting-down point of the load and connecting the node points, and control the actuator such that the load passes through the generated transport path, and
when the sensor detects movement of the obstacle, the control device generates a new transport path after increasing a number of node points arranged around the obstacle.

3. The crane according to claim 2, wherein the control device is further configured to increase the number of the node points inside a substantially hemispherical specific area including the obstacle.

4. The crane according to claim 3, wherein the control device is further configured to increase a density of the node points as the load approaches the obstacle to increase a degree of freedom in generating the transport path.

5. The crane according to claim 3, wherein the control device is further configured to increase a density of the node points as the load approaches a moving direction side of the obstacle to increase a degree of freedom in generating the transport path.

6. The crane according to claim 3, wherein the control device is further configured to set a substantially hemispherical safety area including the obstacle inside the specific area and not arrange the node points inside the safety area.

* * * * *